April 22, 1952  P. S. GRAHAM ET AL  2,594,010
SWITCHBOARD CONSTRUCTION
Filed April 7, 1950
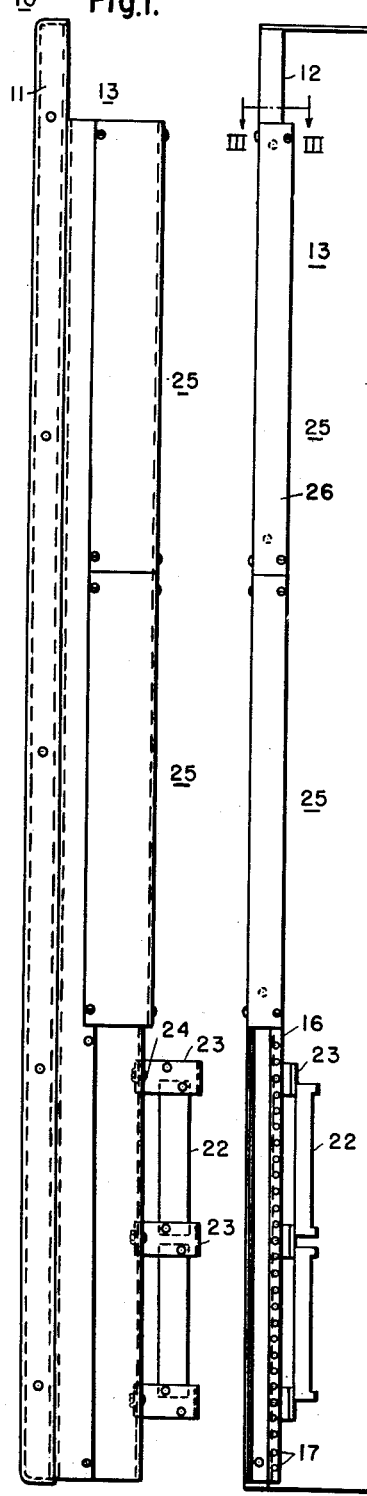
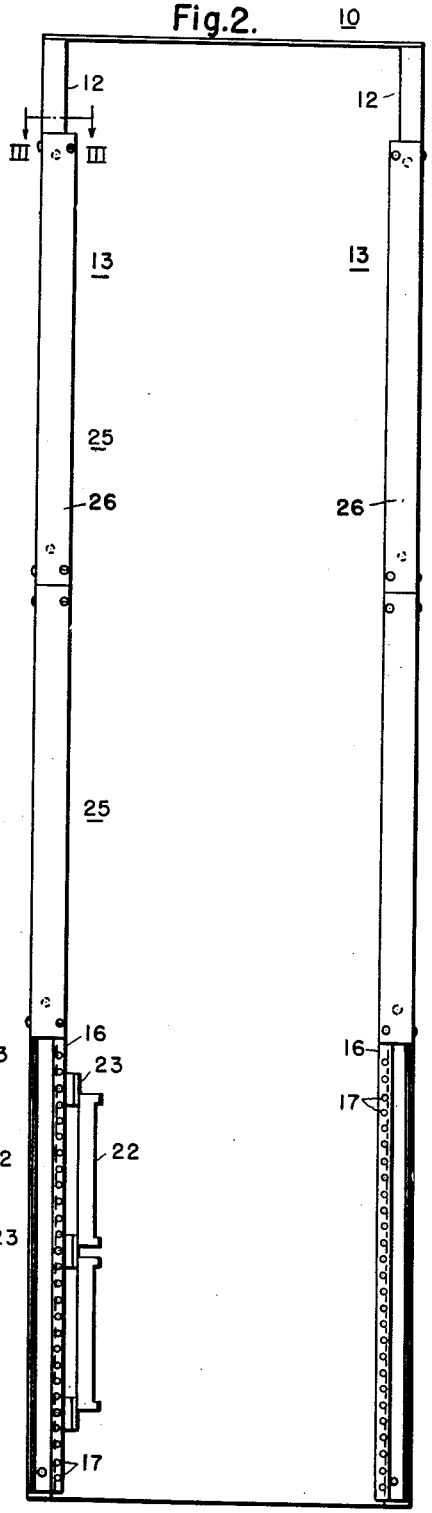
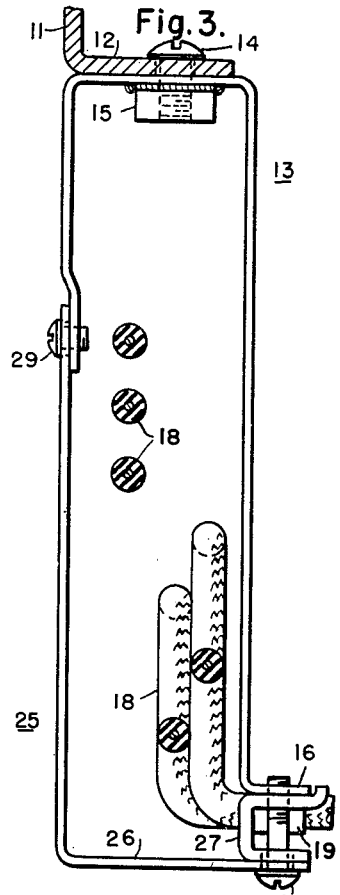
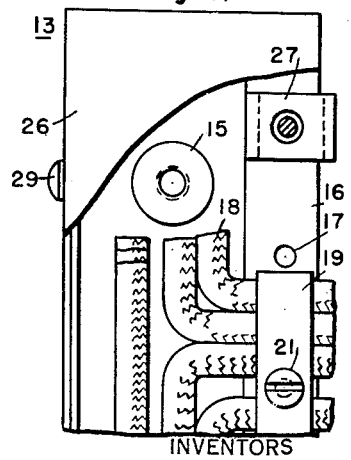
INVENTORS
Paul S. Graham and
Heyward Kennedy.
BY
ATTORNEY Patented Apr. 22, 1952

2,594,010

UNITED STATES PATENT OFFICE 2,594,010

SWITCHBOARD CONSTRUCTION

Paul S. Graham, Pittsburgh, and Heyward Kennedy, McKeesport, Pa., assignors to Westinghouse Electric Corporation, East Pittsburgh, Pa., a corporation of Pennsylvania Application April 7, 1950, Serial No. 154,648

7 Claims. (Cl. 175—298)

Our invention relates, generally, to switchboards and, more particularly, to wire troughs or gutters for switchboards.

Heretofore, wire troughs have usually been located on the backs of switchgear panels, extending along either or both right and left sides, with the wires brought out from the sides of the troughs which are substantially at right angles to the backs of the panels. However, wire troughs of the side outlet type have been made relatively inaccessible by the use of flush or semi-flush mounted instruments and devices on switchboard panels. The bulk of the case of a flush-mounted instrument extends to the rear of the panel and occupies more back-of-panel space than a projection-mounted instrument, thereby making it difficult to gain access to a wire trough of the side outlet type.

An object of our invention is to provide a wire trough which is readily accessible from the rear of a switchboard panel.

Another object of our invention is to provide a wire trough which permits the wires to be retained in groups containing various numbers of wires.

A further object of our invention is to provide a wire trough which may be utilized to support back-of-panel auxiliaries, terminal blocks, and other switchgear equipment.

Still another object of our invention is to provide a wire trough in which the wires may be placed prior to the installation of the trough on the panel or after its installation on the panel.

Other objects of our invention will be explained fully hereinafter or will be apparent to those skilled in the art.

In accordance with one embodiment of our invention, the vertically-run wires or wire groups for a switchboard are substantially enclosed in sheet metal troughs which may be made integral with or attached to the switchboard panels. Each trough has a flange at its rear in which a plurality of relatively closely spaced holes are provided. These holes may be utilized for attaching wire cleats for holding the wires which may be brought out over the flanges at practically any position throughout the length of the troughs. The flanges may also be utilized for attachment of wire trough covers, for mounting back-of-panel auxiliaries, terminal blocks, and other equipment on brackets attached to the flanges by bolts or screws.

For a better understanding of the nature and objects of the invention, reference may be had to the following detailed description, taken in conjunction with the accompanying drawing, in which:

Figure 1 is a view, in side elevation, of a switchboard panel and wire trough embodying the principal features of the invention;

Fig. 2 is a view, in rear elevation of the panel shown in Fig. 1;

Fig. 3 is an enlarged view, in section, taken along the line III—III in Fig. 2, and Fig. 4 is an enlarged view, in rear elevation, of a portion of one of the wire troughs, certain parts being broken away for clearness.

Referring to the drawing, a switchboard panel 10, which may be formed from sheet steel, is provided with a rearwardly extending portion 11 and an inturned flange 12 at each side of the panel. In accordance with the usual practice, electrical instruments and devices may be mounted on the panel. In order to simplify the drawing, these devices have not been shown, but it will be understood that the devices are provided with cases and terminals which may extend some distance to the rear of the rear face of the panel since the present practice is to so mount the devices that the fronts of the cases are substantially flush with the front faces of the panel.

As explained hereinbefore, it has been the prior practice to provide switchboard panels with wire troughs or gutters which have either been formed integrally with the panel or have been attached directly to the backs of the panels. The wires which are connected to the terminals of the devices are brought out from the sides of the troughs which are essentially at right angles to the backs of the panels. These prior schemes are unsatisfactory for the wiring of instruments having terminals which are located at a considerable distance to the rear of the rear face of the panels.

In the present structure, a wire trough or gutter 13 is provided at each side of the panel and may be either removably attached to or welded to the rearwardly extending portion 11 of the panel. As shown most clearly in Fig. 3, the trough 13 is of a U-shape and the bottom of the U may be attached to the inturned flange 12 of the panel by means of screws 14 which are threaded into nuts 15 welded to the trough 13. It will be understood that, if desired, the U-shaped member 13 may be attached to either the inturned flange 12 or the portion 11 of the panel 10. It will also be understood that the trough need not be formed from one piece, but may comprise two separate members which may be welded or bolted to the panel 10 to provide a trough of substantially the same shape as the one illustrated in the drawing. Also the trough may be formed partly by the panel itself and partly by additional trough members.

As shown in Fig. 3, one leg of the trough 13 has an inturned flange 16 which extends substantially parallel to the rear face of the panel 10. If desired, the flange 16 may extend outwardly instead of inwardly. As shown most clearly in Fig. 2, the flange 16 is provided with a plurality of relatively closely spaced holes 17 which preferably extend over the full length of the flange 16.

As shown in Figs. 3 and 4, wires 18 which are disposed in the trough may be brought out over the flange 16 and retained in groups by means of wire cleats 19 which are attached to the flange 16 by screws or bolts 21 inserted into the holes 17 in the flange 16. Thus, the wires may be arranged in groups as desired and retained in position by the cleats 19, thereby making it possible to wire the panel in a neat and orderly manner and retain the wires in the desired position after the panel is wired.

As shown in Figs. 1 and 2, the flanges 16 may also be utilized for mounting back-of-panel auxiliaries, terminal blocks and other switchboard equipment. Terminal blocks 22 are supported by brackets 23 which may be attached to the flanges 16 by bolts or screws 24 inserted in the holes 17. If desired, straps may extend across the rear of the panel and be fastened to the flange at each side of the panel, thereby making it possible to support relatively heavy apparatus on these straps.

Sheet metal covers 25, which may be continuous throughout the length of the trough or sectionalized as shown, may be attached to the backs of the wire troughs 13. As shown in Fig. 3, the cover 25 may be L-shaped with one leg 26 spaced from and disposed parallel to the flange 16 of the trough 13. The leg 26 may be spaced from the flange 16 by spacing members 27 which are located at desired intervals along the cover and retained in position by self-tapping metal screws 28 which are inserted into the holes 17 in the flange 16. The other leg of the cover 25 may be attached to one leg of the trough 13 by means of self-tapping metal screws 29.

Covers of an L-shape, as shown, are utilized on the outside troughs of end panels or on individual panels such as shown in the present drawing. When two or more panels are mounted in side-by-side relation, adjacent troughs may be covered by a common cover which is merely a flat member extending across the troughs and attached to the troughs by spacing members 27 and screws 28 in a manner similar to that in which the leg 26 is attached to the flange 16.

In this manner, the covers are spaced away from the trough flanges to avoid interference with brackets or the wires which are brought out of the troughs. It will be noted that the covers may be so disposed that they practically hide the wire cleats and the bracket attaching means when they are in position, as well as affording protection for the wires 18.

As explained hereinbefore, the wire troughs may be made integral parts of the panel by welding the troughs to the panel. When made up as parts of the panel, the troughs are wired on the job in the conventional manner by placing the wires in the troughs and connecting them directly to the terminals of the devices mounted on the panels. However, it is much easier to wire a panel having troughs of the type shown herein, since they are accessible from the rear of the troughs. As explained hereinbefore, integral troughs having side outlets are at times so inaccessible that it becomes very difficult to wire the panel.

When not made up as integral parts of the panels, but are so made that they are removably attached to the panels, a wire trough, or a pair of wire troughs, for a panel may be bench wired in a horizontal or other position with wires brought out at the desired locations along the trough. These locations may be determined from drawings or from other markings or other provisions on the bench. The brackets, terminal blocks and other auxiliaries to be mounted on the troughs may be bench assembled. Wire ends may be prepared at the bench for final attachment onto the panel equipment terminals, or may be cut to approximate over length for final wiring on the panel.

A trough or pair of troughs thus bench assembled may then be attached to the panel for final connections. This latter method permits faster production, as the panel assembly may proceed without interference while the wiring assembly is being prepared elsewhere for final assembly with the panel.

A particular advantage of the wiring method described in the present case is the relative ease of making changes or adding wires after the assembly has been tested or making circuit changes after installation. By removing the trough covers, wires may be added and brought out to terminals as desired usually without any interference and without spoiling the appearance of the assembly. Changes in the wiring of panels having side outlet troughs are usually very difficult to accomplish after assembly has been completed.

The structure and wiring method herein described produces a switchboard assembly of improved appearance and safety by enclosing and protecting the major portion of the wiring of switchgear panels. Furthermore, the cost of producing panels of the present type is reduced since the time required to wire the panels is shortened, thereby effecting a saving in the labor charge.

Since numerous changes may be made in the above described construction and different embodiments of the invention may be made without departing from the spirit and scope thereof, it is intended that all matter contained in the foregoing description or shown in the accompanying drawing shall be interpreted as illustrative and not in a limiting sense.

We claim as our invention:

1. In a switchboard structure, in combination, a switchboard panel having a rearwardly extending portion with an inturned flange at the side of the panel, a wire trough secured to said flange, said wire trough having a side member extending rearwardly substantially at right angles to the panel and terminating with a flange disposed substantially parallel to the panel, and an L-shaped member having one leg spaced from and disposed parallel to said side member and the other leg spaced from and disposed parallel to the flange on the side member providing an elongated opening between the flange on the side member and the L-shaped member for wires leaving the trough.

2. In a switchboard structure, in combination, a switchboard panel having a rearwardly extending portion with an inturned flange at the side of the panel, a wire trough secured to said flange, said wire trough having a side member extending rearwardly substantially at right angles to the panel and terminating with a flange disposed substantially parallel to the panel, an L-shaped member having one leg spaced from and disposed parallel to said side member and the other leg spaced from and disposed parallel to the flange on the side member providing an elongated opening between the flange on the side member and the L-shaped member for wires leaving the trough, and wire retaining means attached to the flange on the side member.

3. In a switchboard structure, in combination, a switchboard panel having a rearwardly extending portion with an inturned flange at the side of the panel, a wire trough secured to said flange, said wire trough having a side member extending rearwardly substantially at right angles to the panel and terminating with a flange disposed substantially parallel to the panel, an L-shaped member having one leg spaced from and disposed parallel to said side member and the other leg spaced from and disposed parallel to the flange on the side member providing an elongated opening between the flange on the side member and the L-shaped member for wires leaving the trough, and spacing means disposed at intervals between the flange on the side member and the L-shaped member.

4. In a switchboard structure, in combination, a switchboard panel having a rearwardly extending portion with an inturned flange at the side of the panel, a wire trough secured to said flange, said wire trough having a side member extending rearwardly substantially at right angles to the panel and terminating with a flange disposed substantially parallel to the panel, said flange on the side member having a plurality of relatively closely spaced holes therein, an L-shaped member having one leg spaced from and disposed parallel to said side member and the other leg spaced from and disposed parallel to the flange on the side member providing an elongated opening between the flange on the side member and the L-shaped member for wires leaving the trough, and wire retaining means attached to the flange on the side member by means disposed in selected holes in said flange.

5. In a switchboard structure, in combination, a switchboard panel having a rearwardly extending portion with an inturned flange at the side of the panel, a wire trough secured to said flange, said wire trough having a side member extending rearwardly substantially at right angles to the panel and terminating with a flange disposed substantially parallel to the panel, said flange on the side member having a plurality of relatively closely spaced holes therein, an L-shaped member having one leg spaced from and disposed parallel to said side member and the other leg spaced from and disposed parallel to the flange on the side member providing an elongated opening between the flange on the side member and the L-shaped member for wires leaving the trough, and equipment supporting brackets attached to the flange on the side member by means disposed in selected holes in said flange.

6. In a switchboard structure, in combination, a switchboard panel having a rearwardly extending portion at the side of the panel, a wire trough substantially of a U-shape having the bottom of the U secured to said rearwardly extending portion, one leg of said trough extending rearwardly substantially at right angles to the panel and terminating with an inwardly extending flange disposed substantially parallel to the panel, and an L-shaped plate having one leg attached to the other leg of the trough and the other leg of the plate spaced from and disposed parallel to said flange providing an elongated opening between the flange and the L-shaped plate for wires leaving the trough.

7. In a switchboard structure, in combination, a switchboard panel having a rearwardly extending portion at the side of the panel, a wire trough substantially of a U-shape having the bottom of the U secured to said rearwardly extending portion, one leg of said trough extending rearwardly substantially at right angles to the panel and terminating with an inwardly extending flange disposed substantially parallel to the panel, an L-shaped plate having one leg attached to the other leg of the trough and the other leg of the plate spaced from and disposed parallel to said flange providing an elongated opening between the flange and the L-shaped plate for wires leaving the trough, said flange having a plurality of relatively closely spaced holes therein, and wire retaining cleats attached to the flange by means disposed in selected holes.

PAUL S. GRAHAM.
HEYWARD KENNEDY.

REFERENCES CITED

The following references are of record in the file of this patent:

UNITED STATES PATENTS

| Number | Name | Date |
|---|---|---|
| 2,140,376 | Anderson | Dec. 13, 1938 |
| 2,219,887 | Bowly | Oct. 29, 1940 |
| 2,363,327 | Hodgkins | Nov. 21, 1944 |
| 2,427,742 | Peterson | Sept. 23, 1947 |